Oct. 3, 1939.    J. W. EARLY    2,174,693
ARM CONSTRUCTION
Filed March 15, 1938
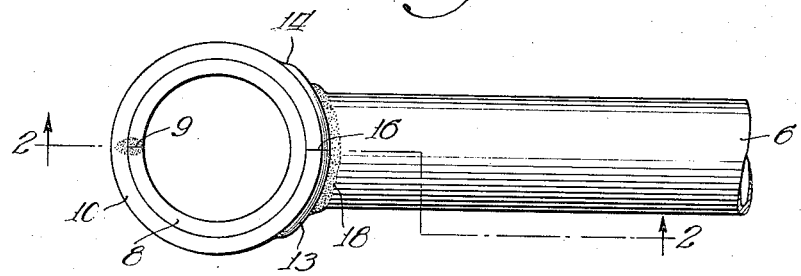
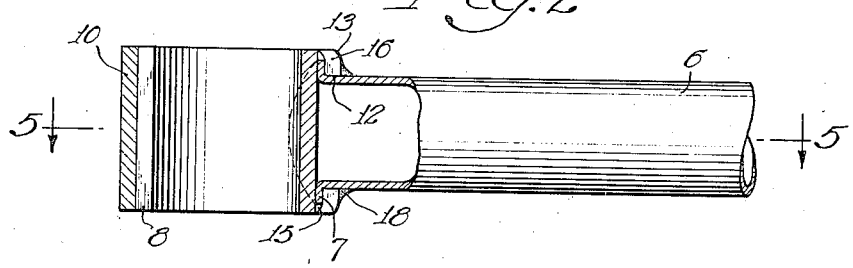
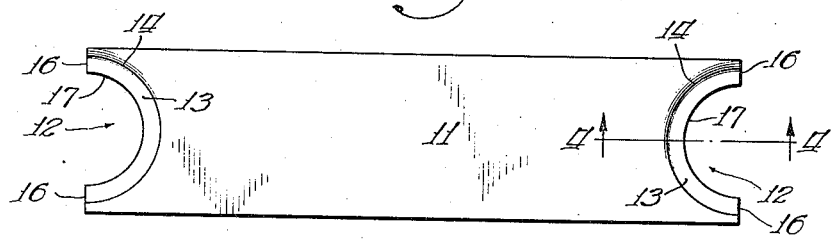
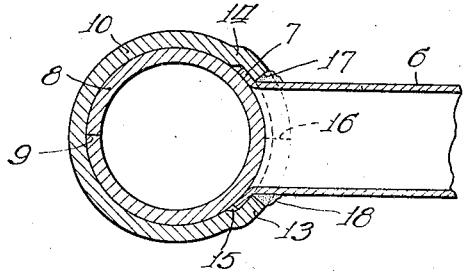 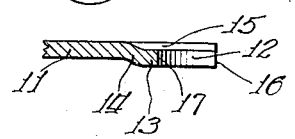
Inventor:
Joseph W. Early
By Edward C. Gritzbaugh
Atty.

Patented Oct. 3, 1939

2,174,693

UNITED STATES PATENT OFFICE 2,174,693

ARM CONSTRUCTION

Joseph W. Early, Chicago, Ill., assignor to Borg-Warner Corporation, Chicago, Ill., a corporation of Illinois Application March 15, 1938, Serial No. 196,019

3 Claims. (Cl. 287—93)

My invention relates to bearings united integrally with the ends of tubular braces, struts, arms, bars, rods, levers, or the like, and has as its principal object to provide a bearing structure of this nature which is inexpensive in construction.

Another object is to provide such a bearing structure which, in addition to being inexpensive as aforesaid, is extremely sturdy and rigid, and will remain so for the life of its component parts.

A further object of the invention is to provide a bearing structure of the character specified, of which the component parts are formed simply of tube and sheet stock and yet are so formed as to fit together accurately with the axis of the bearing portion disposed at right angles to the axis of the tubular arm portion, and with the proper spacing between the ends of the bearing portion and the sides of the arm portion.

Another object of the invention is to provide a novel method of forming a bearing structure having the foregoing characteristics.

Other objects, the advantages and uses of the invention will become apparent after reading the following specification and claims, and after consideration of the drawing forming a part of the specification, wherein:

Fig. 1 is a side view of a bearing structure embodying my invention;

Fig. 2 is a partially sectional view thereof, taken as indicated by the line 2—2 of Fig. 1;

Fig. 3 is a plan view of the securing collar in an intermediate formation state prior to being bent around the bearing bushing;

Fig. 4 is a detail sectional view taken on the line 4—4 of Fig. 3; and

Fig. 5 is a longitudinal sectional view of the bearing structure taken as indicated by the line 5—5 of Fig. 2.

In the accompanying drawing I have shown as an illustrative embodiment of the invention, my improved bearing structure formed on the end of a cylindrical tubular arm 6 which may be of welded tubing. The end of the arm 6 is formed with an annular, outwardly extending flange 7, shaped so as to fit against the exterior cylindrical lateral surface of a bearing bushing 8.

The bushing 8 is formed from a flat blank of sheet metal, which is die-shaped into cylindrical bushing form, and secured in that form by welding its ends together as at 9. Said bushing 8 is secured to the arm portion 6 by means of a ferrule 10, formed from a rectangular blank of sheet metal, indicated at 11 in Fig. 3. The ends of the blank 11 are punched to produce semi-circular notches 12, and the regions adjacent the notches 12 are embossed to form raised flanges 13, the edges of which serve to define the notches 12. The flanges 13 are joined to the blank portion 11 by shoulder portions 14.

In assembling the bearing structure, flange 7 of arm 6 is brought into engagement with the lateral surface of bushing 8, in a suitable jig or die, and ferrule 10, which may have been preformed to roughly cylindrical shape with the ends 16 of the blank spaced apart just far enough to receive the arm 6, is slipped over the bushing 8 and located with its axial ends in registry with the axial ends of the bushing. The ferrule is then closed around the bushing 8 until the ends 16 arrive in abutting engagement with each other, whereupon notches 12 will cooperate to form a circular opening receiving the arm 6, the edges 17 of the flanges 13 snugly abutting against the lateral surface of the arm 6.

During this operation of closing the ferrule, the engagement of the arm 6 by the flanges 13 will cause the arm 6 to be adjusted to a position accurately spaced with respect to the axial ends of the ferrule 10, and therefore accurately spaced with relation to the axial ends of the bushing 8, since, as previously stated, the bushing and collar may be held with their axial ends in registry with one another during the assembling operation.

The assembled relation thus attained is made permanently secure by welding the edges 17 of the flanges 13 to the adjacent region of the arm 6, so as to provide a ring 18 of weld material extending entirely around the arm 6. In this connection, it may be noted that central regions of the flanges 13 will meet the arms 6 at an obtuse angle so as to form triangular shaped spaces between the edges 17 and the surface of the arm 6, which are ideal for welding purposes.

Between the flanges 13, shoulders 14, and bushing 8, are formed annular recesses 15 in which flange 7 of arm 6 is received and snugly engaged between the flanges 13 and the bushing 8.

The joint 9 between the ends of the bushing blank is disposed out of registry with the joints between the ends 16 of the ferrule blank 11, preferably diametrically opposite. Thus, the bushing 8 and ferrule 10 reinforce each other for maximum strength. The joint 9 is preferably formed after the ferrule has been assembled around the bushing 8, and the welding caused to extend into the adjacent region of the ferrule 10, as indicated in Fig. 5.

The bearing structure of my invention may be employed in various rods, bars, arms, struts, braces etc. where an integral bearing member at the end of an arm or bar is required, as for example, in pitmans, or in track bars or Panhard rods for use in metal wheel structure. In the latter embodiment, the bushing 8 and ferrule 10 may both be of hot rolled mild steel sheet stock, of relatively heavy gauge, thicker than the wall of the arm portion 6. In other embodiments, such as where a bearing surface of greater anti-friction characteristics is required, the bushing 8 may be of sheet bronze.

The bearing structure derives considerable strength from the clamping of the flange 7 around its entire periphery against the bushing 8 by the flanges 13 which, embracing the arm 6 from opposite sides, completely encircle it.

It is understood that the foregoing description is merely illustrative of a preferred embodiment of the invention and that the scope of the invention therefore is not to be limited thereto, but is to be determined by the appended claims.

I claim:

1. In a bearing and mounting therefor a bushing having a circular interior cross-section, a ferrule comprising a length of sheet metal extending around said bushing with its end regions in opposed relation, and a rubber arm having one end received between said opposed end regions, said arm being formed at said one end with diametrically opposed outwardly extending flanged regions shaped to conform to the lateral exterior surface of said bushing, said arrangement being further particularly characterized by the inner surface of said end regions being spaced from said bushing to provide with the adjacent surface of said bushing a recess for the reception of said flanged regions, the latter being tightly engaged between said surface and said opposed end regions of the ferrule.

2. In a bearing and mounting therefor, a bushing having a circular interior cross-section, a ferrule formed of a blank of sheet metal extended around said bushing and in contact therewith with the exception of end regions of said blank which are formed with raised flanges defining with the adjacent face of said bushing an annular recess, and a tubular arm one end of which is received between said end regions, said one end being formed with flanged regions shaped to conform to the lateral exterior surface of said bushing, said flanged regions being received in said recess engaged between said bushing and said raised flanges.

3. In a bearing and mounting therefor, a bushing having circular interior cross-section, a ferrule comprising a length of sheet metal extended around said bushing and having abutting end regions formed with semi-circular notches together defining a circular opening, and a cylindrical tubular arm having one end received in said opening and formed with an outwardly extending annular flange shaped to conform to the lateral surface of said bushing, said ferrule in the area of said end regions being spaced from said bushing to define a recess for the reception of said flange in tight engagement therebetween, said ferrule and said tubular arm being welded together in the area of said semi-circular notches.

JOSEPH W. EARLY.